Jan. 6, 1948.  H. D. ISENBERG  2,434,073
METHOD AND APPARATUS FOR MAKING INSULATED CABLE
Filed Feb. 8, 1946  2 Sheets-Sheet 1

INVENTOR
HANS D. ISENBERG
BY Mueller and Mason
ATTORNEYS

Jan. 6, 1948.  H. D. ISENBERG  2,434,073
METHOD AND APPARATUS FOR MAKING INSULATED CABLE
Filed Feb. 8, 1946  2 Sheets-Sheet 2

INVENTOR
HANS D. ISENBERG
BY Mueller & Mason
ATTORNEYS

Patented Jan. 6, 1948

2,434,073

UNITED STATES PATENT OFFICE 2,434,073

METHOD AND APPARATUS FOR MAKING INSULATED CABLE

Hans D. Isenberg, Wilmette, Ill.

Application February 8, 1946, Serial No. 646,464

13 Claims. (Cl. 57—6)

1

The present invention relates to air or gas insulated or coaxial cable as well as methods and apparatus for making the same.

Coaxial cable of the air or gas insulated type used commercially in wide band high frequency circuits is conventionally comprised of two coaxially arranged conductors which are held apart by insulating discs provided at spaced points along the two conductors to support the inner conductor centrally within the outer conductor and thus provide a dielectric air or gas space therebetween. Manual methods are usually employed in assembling the discs upon the inner conductor and within the outer conductor. This is not only costly, but requires that the cable be formed in relatively short lengths or sections which must be joined in order to obtain a cable of any considerable length.

It is an object of the present invention, therefore, to provide an improved air insulated or coaxial cable that may be continuously formed to any desired length.

It is another object of the invention to provide an improved method for the purpose described, which requires a minimum of manual labor in the practice thereof and may be utilized to produce completed cable at a high production rate.

It is a further object of the invention to provide improved and exceedingly simple apparatus which is positive and reliable in its operation to produce air insulated cable continuously at a high production rate.

It is still another and more specific object of the invention to provide improved methods and apparatus for forming around a continuously moving conductor an unbroken or continuous insulating supporting structure upon which an outer conductor or covering may be wrapped to provide an improved air insulated cable.

The invention, both as to its organization and method of operation, together with further objects and advantages thereof, will best be understood by reference to the following specification taken in connection with the accompanying drawings, in which.

2

Figure 1:
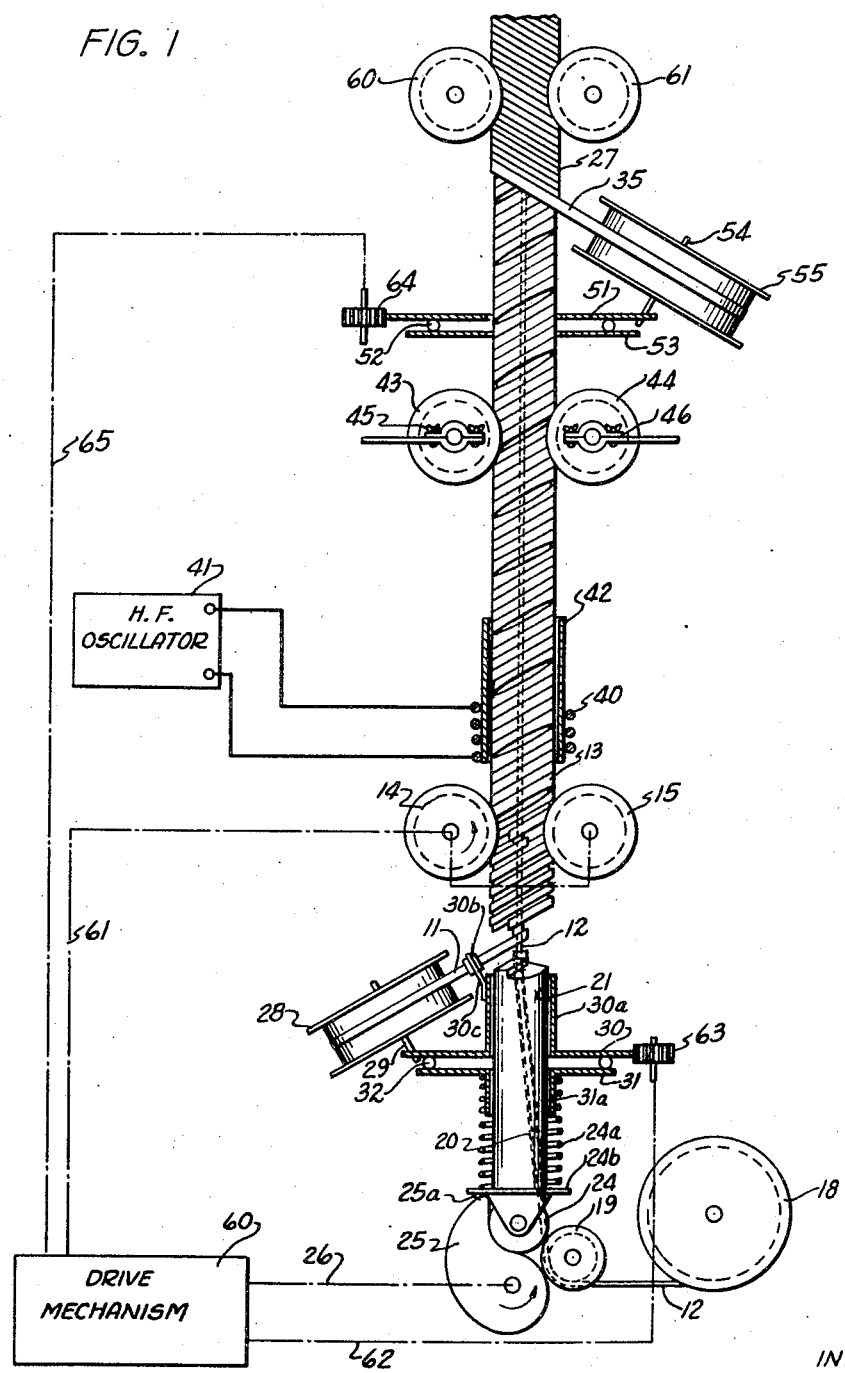
Fig. 1 is a view schematically illustrating improved apparatus for continuously making air insulated cable, which is characterized by the features of the present invention.
Figure 4:
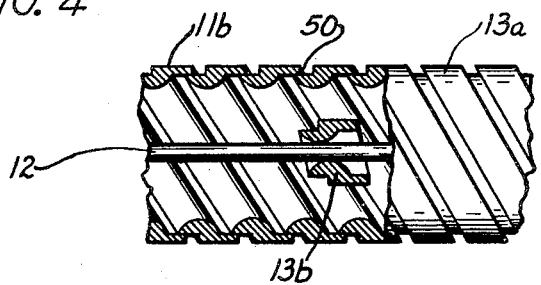
Figure 5:
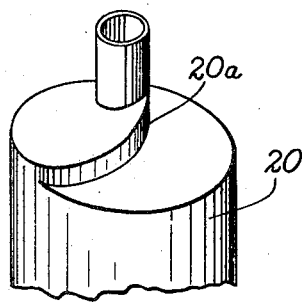

Fig. 4 is a side view partially in section, illustrating a segment of a partially finished cable before the convolutions are forced together; and Fig. 5 is a fragmentary perspective view of one of the elements of the machine shown in Fig. 1.

Referring now to the drawings, the present improved air insulated or coaxial cable is made by forming a continuous filamentary element 11 of plastic insulating material into helical convolutions 13 disposed along the length of the inner conductor 12 of the cable, and utilizing a cylindrical reciprocating mandrel 20, through which the inner conductor 12 is fed, to so vary the diameter of the helical convolutions 13 that certain thereof, i. e., the convolutions 13a are radially spaced from the conductor to support an outer sheath 27, and others thereof, i. e., the convolutions 13b engage the conductor 12 at spaced points along the length thereof to support the radially spaced convolutions 13a from the conductor.

Figure 2:
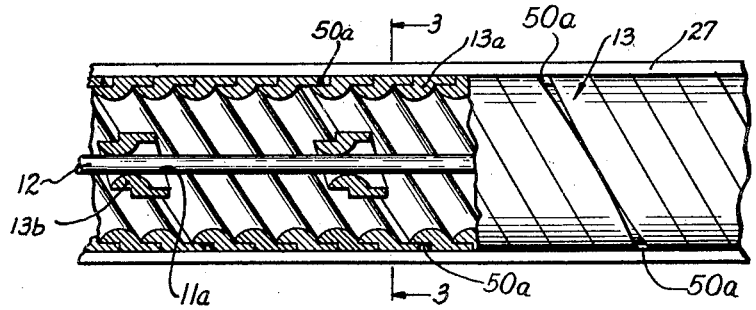
Fig. 2 is a side view partially in section, illustrating a segment of the finished cable produced by use of the apparatus shown in Fig. 1.

More specifically considered, the filament 11 is made of a heat settable or heat annealable plastic which has the property of being settable in a fixed configuration, either when heated to a predetermined temperature, or when heated to a semi-plastic state and then cooled. Specifically this filament may be formed of a phenolic resin, a methyl methacrylate resin, a vinyl chloride acetate resin, a polystyrene resin, a polyvinyl chloride resin or any material having similar properties. This filament is of novel construction. As best shown in Figs. 2 and 4 of the drawings, the filament is of generally Z-shaped cross-section and is provided with rabbets on opposite sides and at the opposite margins thereof so that it may be formed into helical convolutions with each convolution interlocking with the adjacent convolution to form a rabbeted joint. The surface 11a of the filament, which is adapted to contact the conductor 12, is shown as being arcuate, but may be any non-planar surface that will provide minimum contact, i. e. a line contact between the conductor 12 and the filament 11. This minimum contact is an important feature of the improved filament, because tests have established that at ultra high frequencies dielectric losses decrease with a decrease in the amount of contact between a conductor and a dielectric. Preferably, the outer surface 11b of the filament is planar in order that the interlocking convolutions of the filament may form a member having a substantially continuous outer surface. This is especially desirable if the outer sheath 27 is a nonconductor. If, however, the sheath 27 is a conductor such that the structure forms a coaxial cable, and if dielectric losses are to be reduced to a minimum, the surface 11b may also be a non-planar surface. As will be understood, the plastic filament 11 possesses elasticity so that the cable may be bent through a fairly short radius, if necessary.

In brief and as best shown in Fig. 1 of the drawings, the apparatus for forming the described cable comprises a convolution forming mandrel 20 which is slidably supported within a sleeve portion 31a of a fixed support 31 and is provided with a tapered central bore 21 through which the inner conductor 12 is fed from a supply spool 18 over a rotatable supported guide roll 19. This mandrel also extends within a sleeve portion 30a of a rotatable feeding element or table 30 which is supported upon the outer surface of the supporting member 31 by means of ball bearings 32. Adjacent the periphery thereof, the feed table 30 carries an angularly disposed post 29 upon which a supply spool 28 for the filament 11 of insulating material is rotatably supported. The filament 11 is carried through a feed eye 30b provided at the end of an arm 30c which is anchored to the sleeve portion 30a of the feed table 30. Thus the entire filament feed assembly comprising the rotatable table 30 and the supply spool 28 is rotatable around the conductor 12 as it emerges from the upper end of the mandrel 20.

For the purpose of reciprocating the mandrel 20 so that the filamentary element 11 is alternately wound around the upper cylindrical end thereof and directly around the conductor 12, this mandrel is provided at its lower end with a rotatably supported cam following roller 24 biased into peripheral engagement with a rotatable cam 25 by means of a coil spring 24a reacting between the supporting member 31 and a washer-like disc 24b fixed to the lower end of the mandrel. The upper end of this mandrel is of conical configuration such that the diameter of those convolutions 13b which are disposed between the adjacent groups of radially spaced convolutions 13a of uniform diameter is gradually increased and decreased. Further and as best shown in Fig. 5 of the drawings, the upper end of the mandrel 20 is provided with a helical shoulder 20a for picking up the filament 11 and expanding the convolution diameter from the small diameter of the inner convolutions 13b to the large diameter of the radially spaced convolutions 13a.

The conductor 12 and the surrounding helical convolutions 13, after leaving the mandrel 20, pass between a pair of driven rollers 14 and 15. These rollers grip the convolutions 13 and move the structure through the apparatus. After passing between the rollers 14 and 15, the structure enters a helical induction coil 40 which is connected to a source of high frequency current 41. By induction, this coil heats a metallic cylindrical guide 42, thereby heating the filament 11 to the proper temperature to cause permanent and unstressed setting thereof. Upon leaving the guide 42, the helical convolutions are gripped by brake or drag rollers 43 and 44. These rollers are prevented from revolving freely by brakes or drags 45 and 46 which may take any form, but are illustrated as comprising simple split bearings which may be tightened against the roller shafts by thumb screws. The movement of the structure is slowed by drag rollers 43 and 44 so that the helical convolutions 13 are pressed tightly against each other. Thus the partially formed cable structure may leave mandrel 20 in the form shown in Fig. 4, i. e., with the convolutions 13 only partially overlapped such that a gap or interstice 50 is provided in the exterior surface between adjacent convolutions. After leaving the rollers 14 and 15, the convolutions are compressed or forced tightly together as shown in Fig. 2 so that the interstices 50 in the exterior surface are reduced to a minimum and need only appear where one inner convolution 13b enters or leaves the sheath formed by the outer convolution 13a leaving an interstice 50a. However, the interior leg of the Z-shaped filament 11 overlaps sufficiently with the next convolution so that the outer convolutions form a continuous unbroken sheath surrounding the inner conductor 12.

In order spirally to wrap an outer sheath 27 of material about the helical convolutions 13, thereby to complete the formation of the cable, the structure now enters a second winding or wrapping assembly which comprises a table 51 rotatably supported by means of ball bearings 52 upon a fixed supporting member 53. Adjacent its peripheral edge this table fixedly carries an angularly disposed post 54 upon which is rotatably mounted a supply spool 55 for the strip material 35, conductive or insulating, from which the outer sheath 27 of the cable is formed. Rollers 60 and 61 guide the completed cable. A drive mechanism 60, schematically shown, drives the rollers 14 and 15 through a driving connection 61, thereby to move the cable structure through the apparatus at a suitable speed.

This drive mechanism is also utilized to drive the rotatable feed table 30 through a driving connection 62 and a gear 63 engaging the toothed periphery of the table 30. It is also utilized to drive the table 51 through a peripherally engaging gear 64 and a driving connection 65, and to rotate the cam shaft 26. In this regard it is noted that the speeds of rotation of the rotatable elements 14, 51, 30 and 25 are definitely so interrelated within the drive mechanism 16 that each element is operated in a predetermined time relationship with respect to the operation of the other elements.

Figure 3:
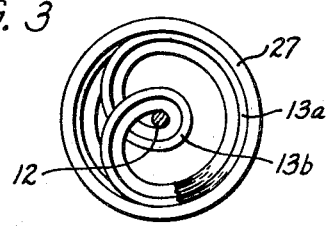
Fig. 3 is a sectional view taken along the lines 3—3 in Fig. 2.

Briefly, to consider the manner in which the above described apparatus is utilized in practicing the present improved method of making the cable shown in Figs. 2, 3 and 4 of the drawings, it will be understood that with the drive mechanism 60 operating, the rollers 14 and 15 are driven to pull the inner conductor 12 which has been secured to the initial convolution 13 through the mandrel 20. In this regard it is noted that shortly before operation of the drive mechanism is initiated, the high frequency current source 41 should be activated in order that the coil may heat the filament 11 to the required temperature for insuring a permanent set of the filament in the desired helical configuration. Immediately operation of the drive mechanism 60 is initiated, this mechanism, in addition to driving the rollers 14 and 15, also functions to rotate the feed table 30 about the axis of the mandrel 20, to rotate the table 51 about the same axis, and to rotate the cam 25. As the feed element 30 is rotated around the mandrel 20, the filament 11 of plastic insulating material is withdrawn from the supply spool 28 and wound around the conductor 12 to produce the helical convolutions 13. Assuming that the parts of the apparatus occupy their illustrated positions at the time operation of the apparatus is initiated, the cam 25, which is driven in a counter-clockwise direction from the illustrated position thereof, coacts with the roller 24 to move the mandrel 20 gradually upward through the sleeve portion 30a of the feed table 30. As the mandrel is moved upward past the feed eye 30b, the filament element 11 gradually climbs up the helical shoulder 20a provided at the conical end 22 of the mandrel to gradually increase the diameter of the convolutions formed by winding the element 11 around the conductor 12. More specifically, the relative rotary speeds of the cam 25 and the feed table 30 are preferably such that the filament 11 climbs up the shoulder 20a to the outer cylindrical surface of the mandrel 20 during the formation of approximately one-half of one convolution. During continued rotation of the cam 25, the mandrel 20 is increasingly advanced through the sleeve portion 30a of the element 30 so that the filament 11 is wound around the outer cylindrical surface of this mandrel to form spaced helical convolutions therealong. When the cam 25 is advanced to bring the point 25a beneath the roller 24 and during continued rotation of the cam, the mandrel 20 is retracted to its starting position under the influence of the biasing spring 24a. Incident to this return movement of the mandrel to its start position, the formed convolutions 13 wound around the upper cylindrical end thereof engage the upper end of the sleeve 30a and are pushed off the mandrel to assume positions spaced along the conductor 12. During final movement of the mandrel back to its starting position, the element 11 is again wound around the conical end 22 of the mandrel to decrease the convolution diameter. Finally, and when the mandrel 20 reaches its fully retracted position, the upper end thereof is so disposed that the filamentary element 11 is wound directly around the inner conductor 12 of the cable to form the supporting convolutions 13b. It will be apparent that by properly relating the short uniform radius portion of the cam 25 to the variable radius portions thereof and to the speed of rotation of this cam and the speed of rotation of the feed element 30, one complete convolution 13 may be wound directly around the conductor 12 as this conductor advances through the mandrel 20.

Further, by properly relating the speed of rotation of the rollers 14 and 15 to the speed of rotation of the table 30, the outer convolutions may be wound in the partially overlapping relationship shown in Fig. 4 of the drawings. From this point on, the described cycle of operations is repeated on an indefinite basis so long as the drive mechanism 60 is maintained in operation. The cable now progresses into the coil 40 where it is heated to the proper setting or annealing temperature for the plastic material used so that it is in a partially plastic, unstressed condition. As the structure moves from the drive rollers 14 and 15 through the drag rollers 43 and 44, the convolutions of the filament are forced together as shown in Fig. 2. While the plastic convolutions are thus held together and upon leaving the guide tube 42, they are allowed to cool and thus are permanently set in fully overlapped positions. It is pointed out that the inner conductor 12 is not tightly gripped by the inner helical convolutions 13b. Accordingly, the inner convolutions 13b may be slipped along the conductor 12 under the influence of the rollers 14 and 15 in passing to the rollers 43 and 44.

From a consideration of Figs. 2, 3 and 4 of the drawings, it will be noted that the resulting insulating supporting structure comprises spaced groups of convolutions 13a of equal diameter which are radially spaced from the inner conductor 12 and are alternated with convolutions 13b which embrace the conductor 12 and serve to support the radially spaced convolutions 13a from this conductor. It will also be understood that since the thermo-plastic or thermo-setting filamentary element 11 is heated to its setting or annealing temperature incident to the formation of the convolutions, a permanent set is imparted to the convolutions 13 which enhances the tendency of these convolutions to reassume the formed positions thereof when distortion pressures imposed thereon are relieved.

Concurrently with formations of the helical convolutions 13 in the manner just described, the outer sheath 27 of the insulating or conducting material is progressively wound around the convolutions 13 to complete the cable structure. This is accomplished through rotation of the table 51 to rotate the strip supply spool 55 around the conductor 12. Incident to such rotation, the strip 35 of insulating or conducting material is withdrawn from the spool 55 and wound in edge overlapping relationship around the conductor 12 tightly to embrace the outer surfaces of the radially spaced convolutions 13a. This strip material may be self-adhering so that the overlapped edges thereof are bonded to prevent separation after the cable is completed. The strip 35 may be formed of tape or foil material or of a suitable braid. It may also be composed of a wound or braided conductor consisting of conductive and insulating strands. Preferably, the table 51 is rotated in a direction opposite to the direction of rotation of the feed table 30, such that the direction of spiral of the strip 35 is opposed to the direction of spiral of the filamentary element 11. Opposed spiralling of the element and the strip 35 enhances the supporting action of the convolutions 13 and thus serves to enhance the rigidity of the completed cable structure. As the completed cable is withdrawn through the rollers 60 and 61 it may be coiled or wound upon a suitable takeup reel for shipment.

From the foregoing explanation, it will be understood that the number of radially spaced convolutions 13a formed between each pair of spaced supporting convolutions 13b depends upon the relative speeds of the feed table 30, the cam 25 and the drive rollers 14 and 15. By appropriately changing the relationship between these speeds within the drive mechanism 16, any desired number of convolutions 13a may be formed between each adjacent pair of supporting convolutions 13b. However, in order to reduce contact with the inner conductor to a minimum and to form an unbroken sheath of convolutions, the preferred arrangement uses only one supporting convolution 13b at spaced intervals between several convolutions 13a.

While there has been described what is at present considered to be a preferred embodiment of the invention, it will be understood that various modifications may be made therein which are within the true spirit and scope of the invention as defined in the appended claims.

I claim:

1. Apparatus for making insulated cable having an inner conductor, comprising means for forming a continuous filamentary element of insulating material into helical convolutions disposed along the length of said conductor, means for so controlling the formation of said convolutions that certain thereof are radially displaced from said conductor and the other convolutions engage said conductor at spaced points along the length of said conductor to support said certain convolutions from said conductor, and means for moving adjacent helical convolutions towards each other to form a continuous sheath surrounding said conductor.

2. Apparatus for making insulated cable having an inner conductor, comprising means for winding a filamentary element of insulating material around said conductor to form helical convolutions disposed along the length of said conductor, means for so controlling the winding of said convolutions that certain thereof are radially displaced from said conductor and the other convolutions engage said conductor at spaced points along the length thereof to support said certain convolutions from said conductor, and means for moving adjacent convolutions toward each other to form a continuous sheath surrounding said conductor.

3. Apparatus for making insulated cable having an inner conductor, comprising means for continuously moving said conductor longitudinally thereof, means operated in timed relationship with said last-named means for continuously winding a filamentary element of insulating material around said conductor to form helical convolutions spaced along the lengths of said conductor and surrounding said conductor, means operated in timed relationship with said last-named means for so controlling the winding of said convolutions that certain thereof are radially displaced from said conductor and the other convolutions engage said conductor at spaced points along the length thereof to support said certain convolutions from said conductor, and means for moving adjacent helical convolutions toward each other to form a continuous sheath surrounding said conductor.

4. Apparatus for making coaxial cable having an inner conductor, comprising a cylindrical convolution forming mandrel, means for continuously moving said conductor through said mandrel, means operated in timed relationship with said last-named means for continuously winding a filamentary element of insulating material to form helical convolutions spaced along the length of said conductor, means operated in timed relationship with said last-named means for so moving said mandrel that said convolutions are formed by alternately wrapping said filamentary element around said mandrel and directly around said conductor, whereby the convolutions formed by wrapping said element around said mandrel are spaced radially from said conductor and the convolutions formed by wrapping said element directly around said conductor serve to support said radially spaced convolutions from said conductor, and means for moving adjacent helical convolutions toward each other to form a continuous sheath surrounding said conductor.

5. Apparatus for making coaxial cable having an inner conductor, comprising a cylindrical convolution forming mandrel, means for continuously moving said conductor through said mandrel, feeding means operated in timed relationship with said last-named means and rotatable around the axis of said mandrel for continuously winding a filamentary element of insulating material around said conductor to form helical convolutions spaced along the length of said conductor, means operated in timed relationship with said feeding means for so reciprocating said mandrel back and forth axially thereof that the predominant portion of said convolutions are formed by wrapping said filamentary element around said mandrel and the remaining portion of said convolutions are formed by wrapping said element directly around said conductor, whereby the convolutions formed by wrapping said element around said mandrel are spaced radially from said conductor and the convolutions formed by wrapping said element directly around said conductor serve to support said radially spaced convolutions from said conductor, and means for moving adjacent helical convolutions toward each other to form a continuous sheath surrounding said conductor.

6. Apparatus for making insulated cable having an inner conductor, comprising a cylindrical convolution forming mandrel having a conical end, means for continuously moving said conductor through said mandrel, feeding means operated in timed relationship with said last-named means for continuously winding a filamentary element of insulating material around said conductor to form helical convolutions spaced along the length of said conductor, means operated in timed relationship with said feeding means for so moving said mandrel that at least the conical end thereof is moved into and out of said convolutions incident to the formation thereof, thereby to so change the diameter of said convolutions that the predominant portions thereof are radially spaced from said conductor, and means for forcing adjacent convolutions together, thereby to form a continuous sheath surrounding said conductor.

7. Apparatus for making a coaxial cable having an inner conductor, comprising means for forming a continuous filamentary element of heat settable or heat annealable plastic insulating material into helical convolutions disposed along the length of said conductor, means for so controlling the formation of said convolutions that certain thereof are radially displaced from said conductor and the other convolutions engage said conductor at spaced points along the length of said conductor to support said certain convolutions from said conductor, means for forcing adjacent convolutions together, and means for heating said formed convolutions as they are forced together, thereby to cause permanent unstressed setting of said element in said convolution form.

8. Apparatus for making coaxial cable having an inner conductor, comprising a cylindrical convolution forming mandrel, means for continuously moving said conductor through said mandrel, means operated in timed relationship with said last-named means for continuously winding a continuous filamentary element of heat settable or heat annealable insulating material to form helical convolutions spaced along the length of said conductor and surrounding said conductor, means operated in timed relationship with said last-named means for so moving said mandrel that said convolutions are formed by wrapping said filamentary element alternately around said mandrel and directly around said conductor, whereby the convolutions formed by wrapping said element around said mandrel are radially spaced from said conductor and the convolutions formed by wrapping said element directly around said conductor serve to support said radially spaced convolutions from said conductor, means for forcing adjacent convolutions together, and means for heating said formed convolutions as they are forced together, thereby to cause permanent unstressed setting of said element in said helical form.

9. The method of making coaxial cable having an inner conductor, which comprises forming a continuous filamentary element of insulating material into helical convolutions disposed along the length of said conductor, so varying the diameter of said convolutions that certain thereof are radially displaced from said conductor and others thereof engage said conductor at spaced points along the length of said conductor, and moving adjacent convolutions toward each other to form a continuous unbroken sheath around said conductor.

10. The method of making coaxial cable having an inner conductor, which comprises forming a continuous filamentary element of insulating material into helical convolutions which surround said conductor out of contact therewith, intermittently decreasing the diameter of said convolutions to bring said element into bearing engagement with said conductor, and forcing adjacent convolutions toward each other to form a continuous unbroken sheath around said conductor.

11. The method of making coaxial cable having an inner conductor, which comprises continuously moving said conductor longitudinally thereof, winding a continuous filamentary element of insulating material around said conductor during movement thereof to form helical convolutions which surround said conductor, so changing the diameter of winding that certain of said convolutions engage said conductor at spaced points therealong and the intervening convolutions are radially spaced from said conductor, and then moving adjacent convolutions toward each other to form a continuous unbroken sheath around said conductor.

12. The method of making coaxial cable having an inner conductor, which comprises forming a continuous filamentary element of insulating material having complementary rabbets on opposite margins thereof into helical convolutions which surround said conductor out of contact therewith, the rabbet on each convolution partially overlapping the complementary rabbet on the adjacent convolution, intermittently decreasing the diameter of said convolutions to bring said element into contacting engagement with said conductor, and moving the adjacent convolutions toward each other so that the complementary rabbets more fully overlap.

13. Apparatus for making insulated cable having an inner conductor, comprising a cylindrical convolution forming a mandrel having a conical end, means for continuously moving said conductor through said mandrel, feeding means operated in timed relationship with said last-named means for continuously winding a filamentary element of insulating material around said conductor to form helical convolutions spaced along the length of said conductor, means operated in timed relationship with said feeding means for so moving said mandrel that at least the conical end thereof is moved into and out of said convolutions incident to the formation thereof thereby to so change the diameter of said convolutions that the predominant portions thereof are radially spaced from said conductor, said mandrel being provided at its conical end with a helical shoulder up which said filamentary element climbs in increasing the diameter of said convolutions, and means for forcing adjacent convolutions together, thereby to form a continuous sheath surrounding said conductor.

HANS D. ISENBERG.

REFERENCES CITED

The following references are of record in the file of this patent:

UNITED STATES PATENTS

| Number | Name | Date |
|---|---|---|
| 2,090,744 | Boe | Aug. 24, 1937 |
| 2,395,872 | Isenberg | Mar. 5, 1946 |